United States Patent
Kanafani et al.

(10) Patent No.: US 7,481,738 B2
(45) Date of Patent: Jan. 27, 2009

(54) CONTROLLING A GEAR RATIO IN A CONTINUOUSLY VARIABLE TRANSMISSION

(75) Inventors: Fadi S Kanafani, Windsor (CA); P Brian McGrath, Chelsea, MI (US)

(73) Assignee: Chrysler LLC, Auburn Hills, MI (US)

( * ) Notice: Subject to any disclaimer, the term of this patent is extended or adjusted under 35 U.S.C. 154(b) by 396 days.

(21) Appl. No.: 11/428,971

(22) Filed: Jul. 6, 2006

(65) Prior Publication Data

US 2007/0142170 A1 Jun. 21, 2007

Related U.S. Application Data

(60) Provisional application No. 60/750,923, filed on Dec. 16, 2005.

(51) Int. Cl.
*B60W 10/04* (2006.01)
*B60W 10/10* (2006.01)
*G06F 17/00* (2006.01)
*G06F 19/00* (2006.01)
*G06F 7/00* (2006.01)

(52) U.S. Cl. .................. 477/110; 477/111; 701/54; 701/66

(58) Field of Classification Search ............... 477/110, 477/111; 701/54, 66
See application file for complete search history.

(56) References Cited

U.S. PATENT DOCUMENTS

| | | | |
|---|---|---|---|
| 4,539,643 A * | 9/1985 | Suzuki et al. | 701/112 |
| 5,125,294 A * | 6/1992 | Takashi et al. | 477/154 |
| 5,127,501 A * | 7/1992 | Arikawa | 477/185 |
| 5,586,953 A * | 12/1996 | Abo | 477/47 |
| 6,076,898 A * | 6/2000 | Ota et al. | 303/139 |
| RE38,241 E | 8/2003 | Toukura | |
| 6,847,880 B2 * | 1/2005 | Ishizu et al. | 701/95 |

* cited by examiner

*Primary Examiner*—Tisha D Lewis
(74) *Attorney, Agent, or Firm*—Ralph E. Smith

(57) ABSTRACT

This invention provides a method for controlling a gear ratio in an automatic transmission of a vehicle. The method includes detecting a desired engine braking condition associated with the vehicle. Once the engine braking condition is determined, a decay factor is determined for reducing the gear ratio of the transmission. The decay factor maintains the gear ratio for a delayed period of time before gradually reducing the gear ratio over time. After determining the decay factor, the gear ratio of the transmission is controlled in accordance with the decay factor.

20 Claims, 2 Drawing Sheets

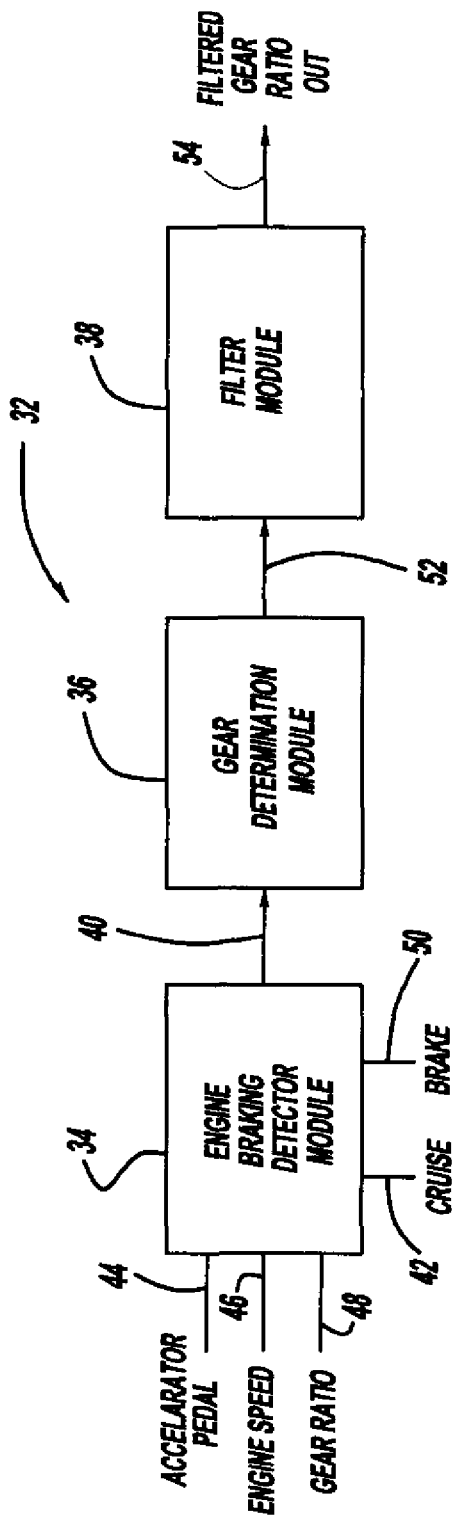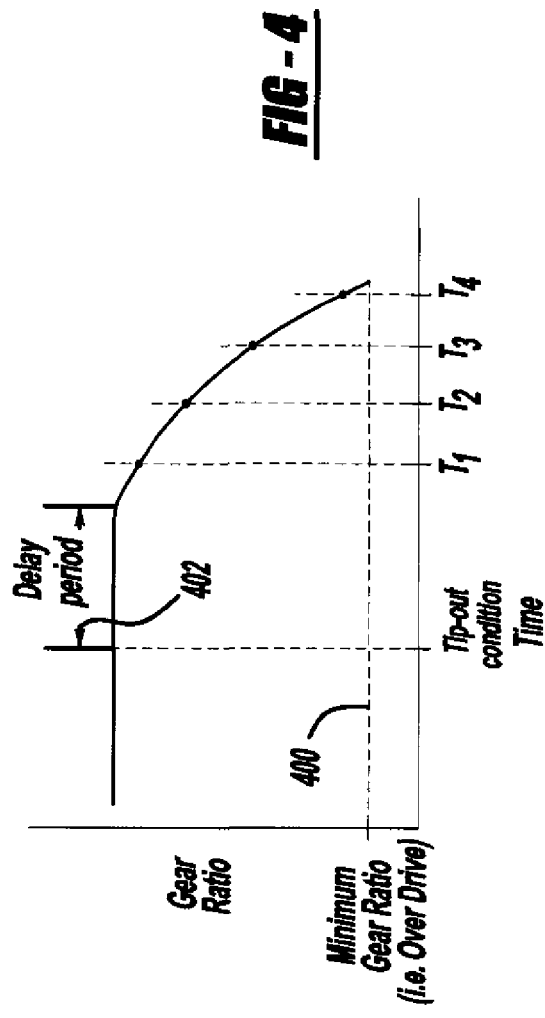

US 7,481,738 B2

CONTROLLING A GEAR RATIO IN A CONTINUOUSLY VARIABLE TRANSMISSION

CROSS REFERENCE TO RELATED APPLICATION(S)

This application claims benefit of U.S. Provisional Application Ser. No. 60/750,923 filed on Dec. 16, 2005.

FIELD OF THE INVENTION

The present invention relates to a method for controlling the gear ratio in a continuously variable automatic transmission of a vehicle, such that the vehicle operator obtains a driving "feel" similar to a conventional automatic transmission.

BACKGROUND OF THE INVENTION

Continuously variable transmissions (CVT) include primary and secondary pulleys used to continuously vary the transmission ratio of the engine speed to vehicle speed in a motor vehicle. Unlike conventional automatic and manual transmissions, continuously variable transmissions have a different driving "feel" since they do not have discrete gear selections.

Generally in a CVT system, if an operator of a vehicle obtains a high gear ratio then disengages an accelerator pedal, the transmission will automatically and continuously immediately reduce a gear ratio to a lowest gear ratio available. Hence, engine braking "feel" is minimal. In order for the operator to regain the previous performance of the vehicle, the operator must engage the accelerator pedal and wait until the high gear ratio is achieved by the CVT.

Therefore, it is desirable to provide a method for controlling the gear ratio of a CVT to selectively delay gear ratio reduction in order to achieve a desirable engine braking condition.

SUMMARY OF THE INVENTION

In accordance with the present invention, a method is provided for selectively controlling reduction in gear ratio of a continuously variable transmission in a motor vehicle. The method includes detecting a desired engine braking condition associated with the vehicle. Once the desired engine braking condition is detected, a decay factor is determined. The decay factor maintains the gear ratio for a predetermined period of time before gradually reducing the gear ratio over time. After determining the decay factor, the gear ratio of the transmission is controlled in accordance with the decay factor. This invention improves drivability, fuel economy and allows for better control in deceleration conditions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a block diagram of a software implementation system utilizing the method for controlling a gear ratio of a transmission; and FIG. 4 is a graphical diagram illustrating a continuum of desired gear ratios along a curve.

DETAILED DESCRIPTION OF THE PREFERRED EMBODIMENTS

The following description of the preferred embodiment(s) is merely exemplary in nature and is in no way intended to limit the invention, its application or uses.

Figure 1:
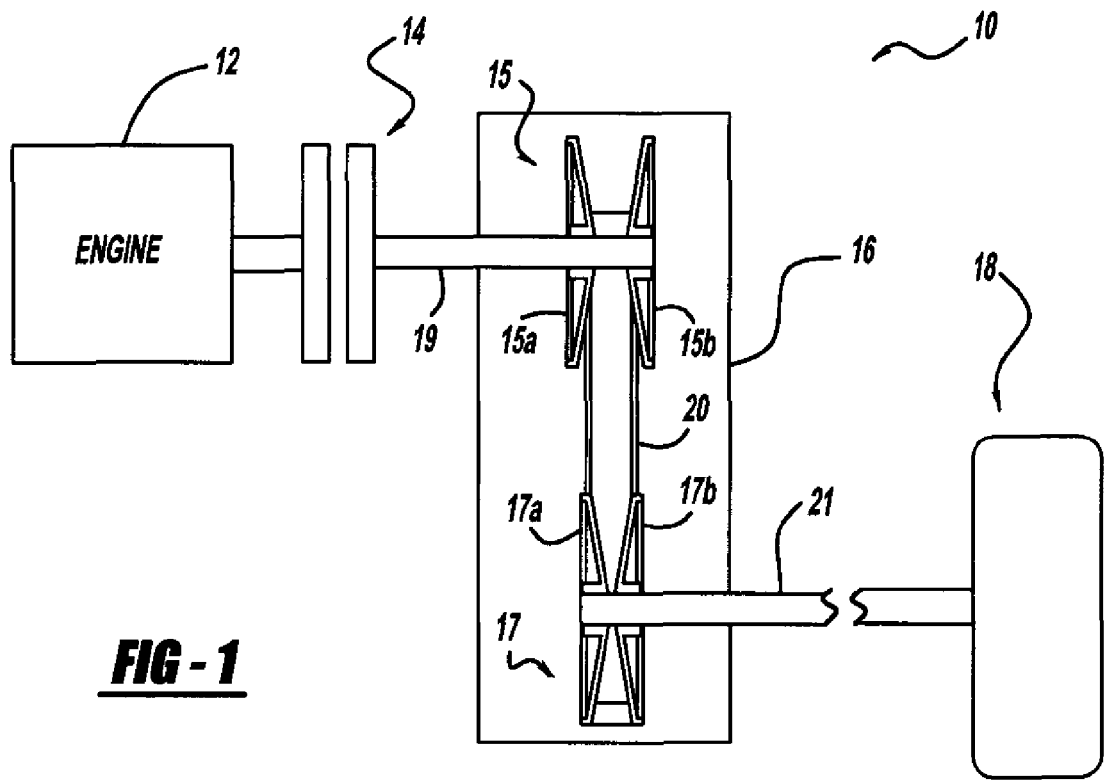
FIG. 1 is a schematic view of a powertrain having a continuously variable transmission.

FIG. 1 depicts an exemplary powertrain having a continuously variable transmission. Briefly, the powertrain 10 is comprised of an engine 12 coupled to a torque converter 14. The torque converter 14 has an output shaft 19 which is in turn coupled to a continuously variable transmission (CVT) 16. The CVT 16 has an output shaft 21 which is in turn coupled through a differential (not shown) to at least one wheel 18 of a motor vehicle.

The CVT 16 generally includes a driving pulley 15 coupled to a driven pulley 17 via a belt 20. The driving pulley 15 is driven by the engine 12 through the torque converter 14. When the torque converter 14 is fully locked, engine speed is approximately equal to a speed of the driving pulley 15. The primary pulley 15 drives the belt 20 that in turn drives the pulley 17. The vehicle speed is approximately a direct function of a speed of the driven pulley 17, based upon gear ratio through the differential or any final drive gear (not shown). The CVT 16 provides a gear ratio based on a ratio of engine speed to vehicle speed.

Driving pulley 15 has two flanges 15a and 15b, at least one of which is axialy moveable. Likewise driven pulley 17 has two flanges 17a and 17b, at least one of which is axially moveable. The continuously variable spacing between flanges determine the speed ratio of the CVT.

Figure 2:
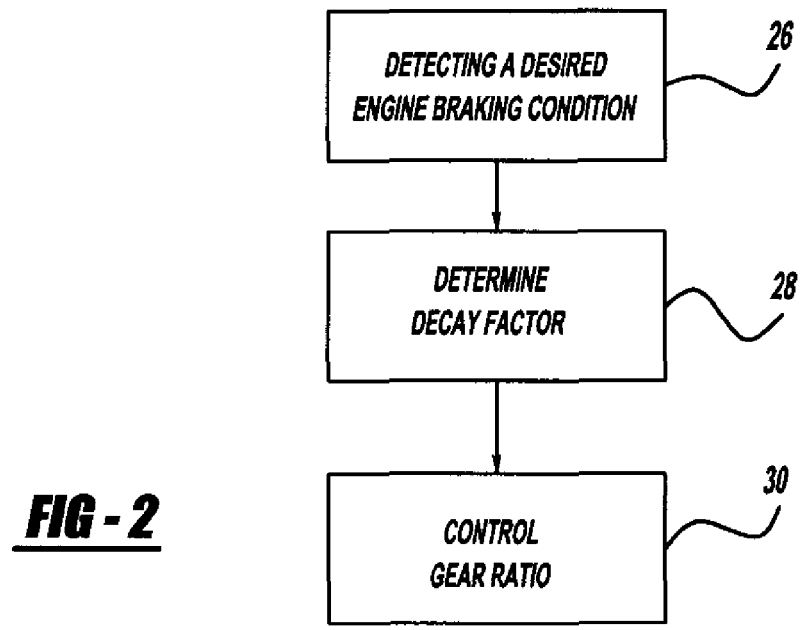
FIG. 2 is a flowchart illustrating a method for controlling a gear ratio of a transmission in accordance with the present invention.

FIG. 2 illustrates a method for controlling a gear ratio of a continuously variable transmission in a motor vehicle. The method includes detecting a desired engine braking condition at step 26. Upon detecting the desired engine braking condition, a decay factor is determined for reducing the gear ratio of the transmission at step 28. In an exemplary embodiment, the decay factor maintains the gear ratio for a period of time before gradually reducing the gear ratio. At step 30, the gear ratio is controlled in accordance with the decay factor.

An exemplary software-implementation system 32 for implementing the method is further described in relation to FIG. 3. The system 32 includes an engine braking detector module 34, a gear determination module 36 and a filter module 38. In a preferred embodiment, the engine braking detector module 34 is coupled to the gear determination module 36. Additionally, the gear determination module 36 is coupled to the filter module 38.

Upon detecting selected vehicle operations, the engine braking detector module 34 determines a desired engine braking condition and activates a trigger 40 associated with the gear determination module 36. The desired engine braking condition occurs when the engine braking detector module 34 detects a tip-out condition, an engine braking indicator and a deactivated cruise control input 42. The tip-out condition occurs when an operator of the vehicle releases a previously engaged accelerator pedal 44 in the vehicle. The engine braking indicator is determined based on engine speed 46 and a gear ratio 48 fed into the engine braking detector module 34. At the occurrence of the tip-out condition, engine speed 46 is compared to a minimum engine speed threshold. Likewise, the engine braking detector module 34 compares the gear ratio 48 to a minimum gear ratio threshold. Upon detection of engine speed 46 exceeding the engine speed threshold and the gear ratio 48 exceeding the gear ratio threshold, the engine braking detector module 34 activates the engine braking indicator. Additionally, a cruise control input 42 is fed into the engine braking detector module 34. The engine braking detector module 34 monitors the cruise control input 42 to determine whether the cruise control input 42 is in an active state. An active cruise control input 42 is indicative of a non-engine braking condition. Optionally, a brake pedal input 50 may be fed into the engine braking detector module 34. The engine braking detector module 34 monitors the brake pedal input 50 to determine an active state. An active brake pedal input 50 is indicative of the desirable engine braking condition. Once the engine braking detector module 34 determines that engine braking is desirable, the engine braking detector module 34 activates the trigger 40 associated with the gear determination module 36.

Upon activation by the trigger 40, the gear determination module 36 determines a decay factor and controls the gear ratio 48 in accordance with the decay factor. The gear determination module 36 includes a timer (not shown) and a gear control module (not shown). The timer is coupled to the gear control module. Once the trigger 40 is activated, the gear determination module 36 starts the timer. The timer is used to lookup a predetermined decay factor at discrete intervals of time. The decay factor maintains the gear ratio 48 for a period of time then gradually reduces the gear ratio 48 at discrete intervals of time. Additionally, the decay factor is calibrated to produce a desired gear ratio 52 such that the desired gear ratio 52 aligns approximately along a path changing in a predetermined fashion. The timer sends the decay factor to the gear control module. Upon receipt of the decay factor, the gear control module multiplies the gear ratio 48 by the decay factor to produce the desired gear ratio 52. The desired gear ratio 52 is set to a value along a continuum of gear ratios. FIG. 4 depicts an example of the path changing in the predetermined fashion in which the desired gear ratio aligns, once the tip-out condition has occurred. In FIG. 4, the gear ratio 48 is maintained for a delayed period of time 402 then reduced by the decay factor at discrete intervals of time, such as T1, T2, T3 and T4, along a predetermined path until a minimum gear ratio threshold 400 is reached.

Additionally, the gear determination module 36 reduces the gear ratio 48 until the trigger 40 for the engine braking condition is deactivated. The trigger 40 for the engine braking condition may become deactivated when any of the vehicle operations used to activate the trigger 40 no longer exists, such as an engaged accelerator pedal input 44, an active cruise control input 42 or an inactive indicator for engine braking.

Upon receipt of the desired gear ratio 52, the filter module 38 uses the desired gear ratio 52 to determine a filtered gear ratio 54. The filter module 38 applies a smoothing filter to the desired gear ratio 52 to achieve a gentle gear reduction as felt by an operator of the vehicle. The filter module 38 sends the filtered gear ratio 54 to the transmission such that the speeds of the driving pulley 15 and the driving pulley 17 may be adjusted to attain the filtered gear ratio 54. Additionally, the filter module 38 may determine the minimum gear ratio threshold 400 (i.e. overdrive). The filtered gear ratio 54 is sent to the CVT 16 until the filtered gear ratio 54 equals the minimum gear ratio threshold.

Additionally as used in this description, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling a gear ratio in an automatic transmission of a vehicle, the method comprising:
    detecting a desired engine braking condition associated with the vehicle;
    determining a decay factor for reducing the gear ratio of the transmission, where the decay factor maintains the gear ratio for a delayed period of time before gradually reducing the gear ratio over time; and
    controlling the gear ratio of the transmission in accordance with the decay factor whereby a preselected engine braking condition is achieved.

2. The method of claim 1 wherein the transmission is further defined as a continuously variable transmission, such that the gear ratio may be set to a value along a continuum of gear ratios.

3. The method of claim 1 wherein detecting an engine braking condition further comprises monitoring a position of an accelerator pedal in the vehicle for an inactive state.

4. The method of claim 1 further comprising determining a decay factor for reducing the gear ratio when an engine speed exceeds a minimum engine speed threshold and a ratio between the engine speed and vehicle speed exceeds a minimum ratio threshold.

5. The method of claim 1 wherein controlling the gear ratio further comprises computing a desired gear ratio at discrete intervals of time.

6. The method of claim 1 further comprising adjusting the gear ratio of the transmission in accordance with the decay factor until a predefined minimum gear ratio is reached.

7. A method for controlling a gear ratio in a continuously variable transmission during a deceleration condition in a vehicle, the method comprising:
    detecting an desirable engine braking condition associated with the vehicle;
    determining a decay factor for maintaining the gear ratio for a delayed period of time before gradually reducing the gear ratio along a predetermined path over time to force the gear ratio and vehicle speed to decline such that the gear ratio may be set to a value along a continuum of gear ratios, wherein the decay factor is determined when an engine speed exceeds a minimum engine speed threshold and a ratio between the engine speed and vehicle speed exceeds a minimum ratio threshold; and
    controlling the gear ratio of the transmission in accordance with the decay factor whereby a preselected engine braking condition is achieved.

8. The method of claim 7 wherein detecting the engine braking condition further comprises monitoring a position of an accelerator pedal in the vehicle for an inactive state.

9. The method of claim 7 wherein adjusting the gear ratio further comprises computing a desired gear ratio at discrete intervals of time and applying a smoothing filter to the desired gear ratio.

10. The method of claim 7 further comprising adjusting the gear ratio of the transmission in accordance with the decay factor until a predefined minimum gear ratio is reached.

11. The method of claim 7 wherein detecting the engine braking condition further comprises monitoring a cruise control function in the vehicle for an inactive state.

12. The method of claim 7 wherein detecting the engine braking condition further comprises monitoring a position of a brake pedal in the vehicle for an active state.

13. A computer implemented system for controlling a gear ratio in an automatic transmission, the system comprising:
   an engine braking detector module associated with a powertrain system in a vehicle for detecting a desired engine braking condition and generating an indication of engine braking; and
   a gear ratio determination module coupled to the engine braking detector module for receipt of the indicator, where the gear ratio determination module determines a decay factor for reducing the gear ratio of the transmission, where the decay factor maintains the gear ratio for a delayed period of time before gradually reducing the gear ratio over time, wherein the gear ratio determination module controls the gear ratio of the transmission in accordance with the decay factor to achieve a preselected engine braking condition.

14. The system of claim 13 wherein the transmission is further defined as a continuously variable transmission, such that the gear ratio may be set to a value along a continuum of gear ratios.

15. The system of claim 13 wherein the engine braking detector module is further operative to detect a released state of a previously engaged accelerator pedal.

16. The system of claim 13 wherein the gear determination module is further operative to determine the decay factor for reducing the gear ratio when an engine speed exceeds a minimum engine speed threshold and a ratio between the engine speed and vehicle speed exceeds a minimum ratio threshold.

17. The system of claim 13 further comprising a filter module coupled to the gear ratio determination module for receipt of the desired gear ratio and applying a smoothing filter to the desired gear ratio.

18. The system of claim 13 wherein the gear determination module is further operative to compute the desired gear ratio at discrete intervals of time.

19. The system of claim 13 wherein the engine braking detector module is further operative to detect an inactive state for a cruise control function in the vehicle.

20. The system of claim 13 wherein the engine braking detector module is further operative to detect an active state of a brake pedal in the vehicle.

* * * * *